Aug. 7, 1956 J. L. CHAMBON 2,757,497
APPARATUS FOR AUTOMATICALLY DRYING AND PACKING
A LUMP PRODUCT MANUFACTURED CONTINUOUSLY
Filed Sept. 8, 1951 5 Sheets-Sheet 1

Inventor
Jean-Louis Chambon
By Robert E. Burns
Attorney

Aug. 7, 1956

J. L. CHAMBON 2,757,497

APPARATUS FOR AUTOMATICALLY DRYING AND PACKING
A LUMP PRODUCT MANUFACTURED CONTINUOUSLY

Filed Sept. 8, 1951

Inventor
Jean-Louis Chambon
By Robert E. Burns
Attorney

United States Patent Office 2,757,497
Patented Aug. 7, 1956

2,757,497

APPARATUS FOR AUTOMATICALLY DRYING AND PACKING A LUMP PRODUCT MANUFACTURED CONTINUOUSLY

Jean Louis Chambon, Paris, France, assignor to Societe d'Etudes de Machines Speciales, Paris, France Application September 8, 1951, Serial No. 245,760

Claims priority, application France January 27, 1949

3 Claims. (Cl. 53—159)

This invention relates to a method of forming dried and packed lump products through a continuous automatic circuit from an automatic machine of the type designed to manufacture the lumps of product to be dried and to deliver them by successive contingents consisting each of a given amount of lumps laid simultaneously as a flat layer.

It is another object of the invention to provide an apparatus for carrying out the above method.

Moreover, one object of this invention is to provide an equipment whereby dried and packed lump products are formed through a continuous automatic circuit from an automatic machine delivering the lumps to be dried, this equipment having particularly reduced over-all dimensions.

One further object of this invention is to provide an installation in which dried and packed lump products are formed through a continuous automatic circuit from an automatic machine delivering the lumps to be dried, wherein the movement is controlled by the prime mover by which the automatic machine is operated.

The method and apparatus according to this invention are applicable to many products but more particularly to lump products obtained by molding a moistened pulverulent product, especially lump sugar obtained through this process.

The method consists in receiving the successive contingents of lumps distributed by the automatic machine on plates laid on a horizontal conveyor to which a uniform motion is imparted, feeding these plates one by one through another horizontal conveyor moving at a uniform speed to an elevator enclosed in a fluid-tight heated chamber and adapted to carry these plates to another level, subsequently circulating the loaded plates through a horizontal fluid-tight heated tunnel on a further horizontal conveyor disposed at the upper portion of the elevator, lowering these plates to the initial level inside another elevator enclosed in a fluid-tight and heated chamber and positioned at the opposite end of the other horizontal conveyor, and feeding the plates by means of a next intermittently-moving horizontal conveyor to a last horizontal conveyor carrying empty boxes, filling these boxes one by one through a device for loading contingents of lumps carried by the plates travelling in front of each box, the thus unloaded plates being transferred by the intermittently-moving horizontal conveyor by which the same plates had previously been circulated in front of the boxes to be filled to the first continuous horizontal conveyor which again feeds them to the machine for the purpose of a new loading.

The equipment is characterized by the synchronism of the different automatic operations: continuous linear movement of the first conveyor, variable discontinuous motion of the other conveyors, up- and downward movements of the elevators, movements of the loading device and of the uatomatic machine.

Finally, other characteristic features of the equipment according to the invention will become apparent from the following description reference being made to the attached drawings forming part of this specification and illustrating diagrammatically by way of example a practical embodiment of the invention. In the drawings.

Figure 1:
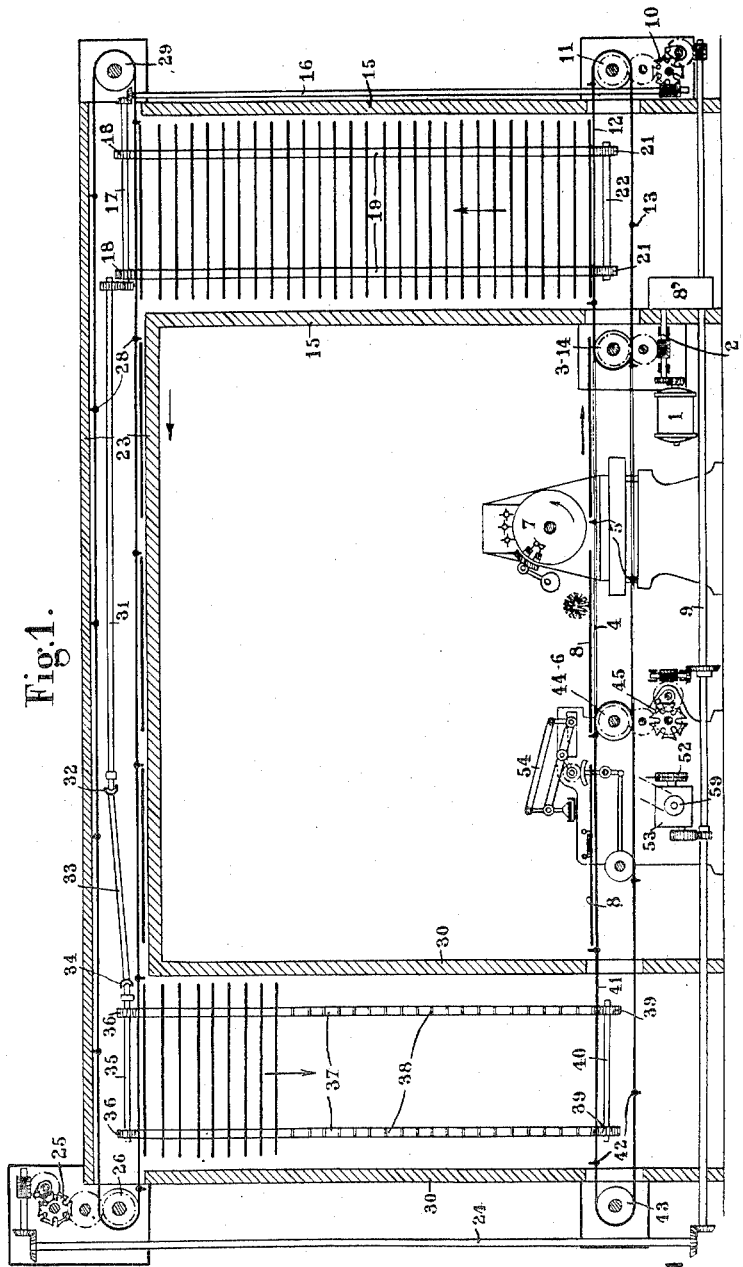
Figure 1 is an elevational view illustrating the drying chambers sectionally.

A motor 1 rotatably drives through spur gears a shaft 2 formed or fast with a worm meshing in turn with a worm wheel through which a pair of coaxial sprocket wheels 3 are rotated. The latter have wound thereon endless chains 4 provided with projections or catches 5 and passed round another pair of guiding sprockets 6. Overlying the endless chains 4 there is an automatic machine actuated by the motor 1, adapted to manufacture the product to be dried and to distribute same in the form of successive contingents. This machine, shown in unitary form at 7 in Fig. 1 comprises, as shown more in detail in Fig. 6, a rotary drum 65 disposed beneath a hopper 61 in which rotary stirrers 62 are mounted. A number of radial recesses 63 are cut in the drum 65. Each recess has slidably mounted therein a pair of pistons 64 actuated through connecting rods 67 pivotally attached to a slide 68 having its axis parallel to the drum axis. This slide is movable within a radial guiding notch formed in the drum and is reciprocated through the medium of rollers 66 engaging a set of stationary cams 68, 69 and 70.

Figure 2:
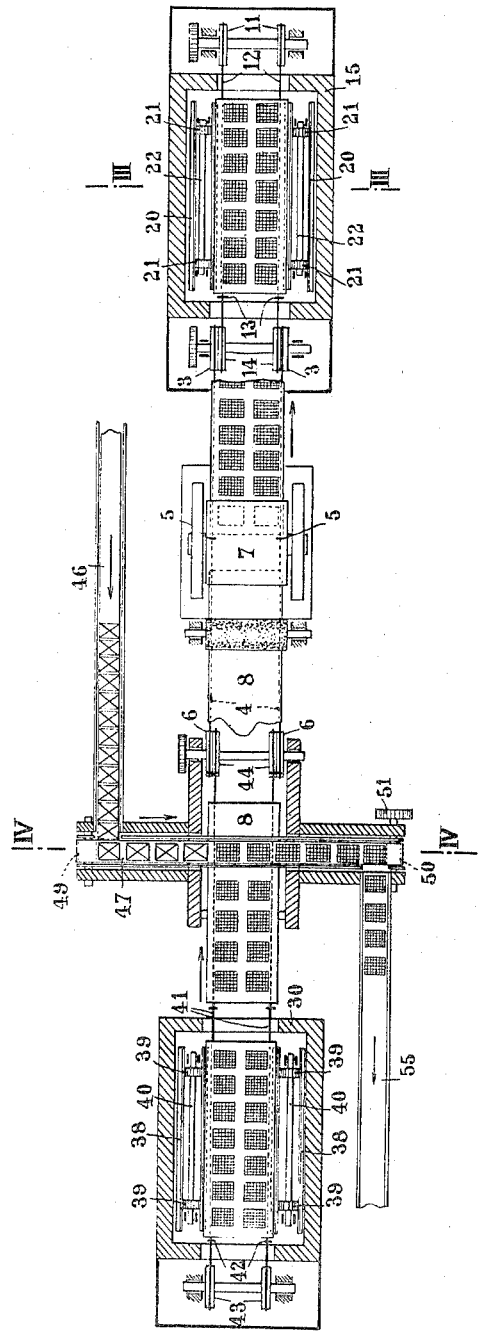
Figure 2 is a part sectional plan view illustrating the drying chambers sectionally.
Figure 3:
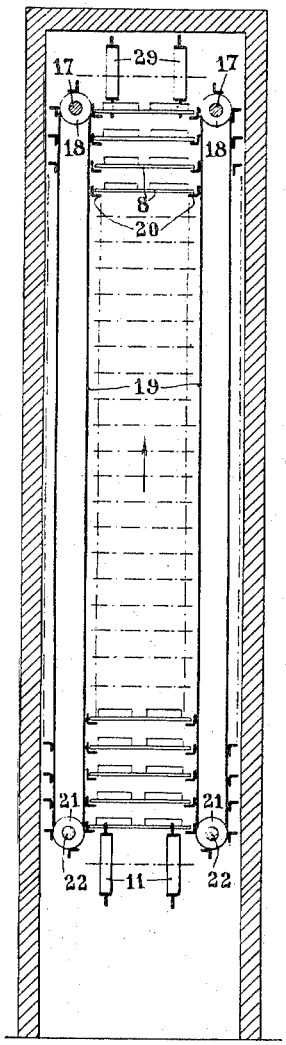
Figure 3 is a vertical section according to the line III—III of Fig. 2.
Figure 6:
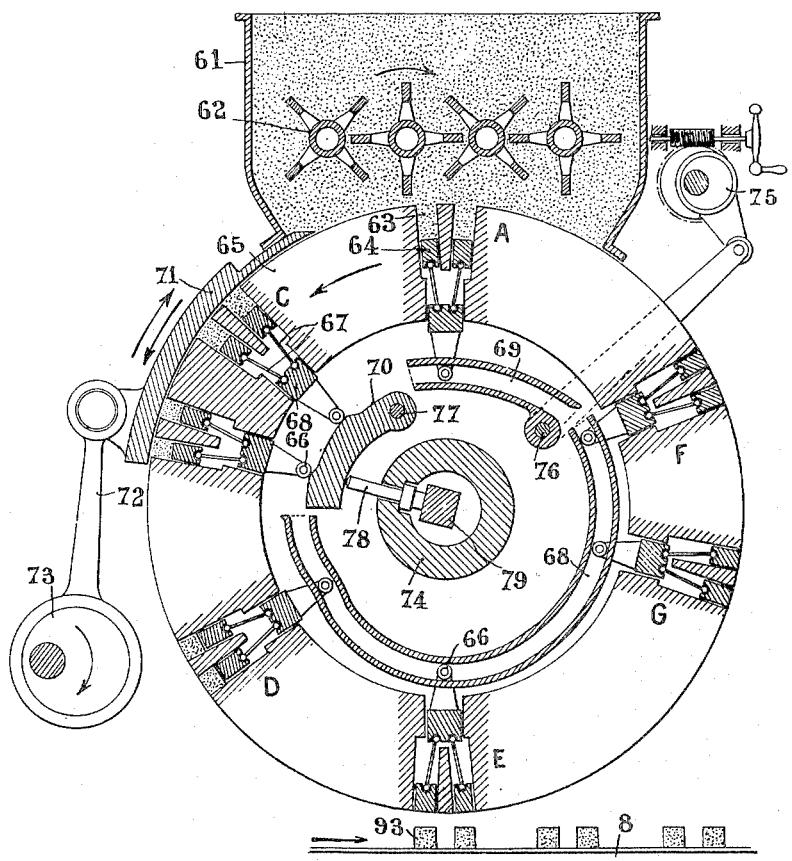
Figures 6 and 7 illustrate at a greater scale than Fig. 1 respectively in section the lump-distributing machine and in elevation the mechanism for filling empty boxes with the product.

A curved plate 71 bound by two generatrices and by the bases of drum 65 engages the outer surface of this drum and is pivotally attached to one end of connecting rod 72 having its other end mounted on an eccentric 73 or operatively connected to any suitable member adapted to impress a swinging reciprocating motion to the curved plate 71 along a part-circular path concentric to the drum central shaft 74 as shown by the arrow in Fig. 6. The cam member 69 is pivotally mounted at 76 and adjustable by means of a screw-and-eccentric device 75. The other cam member 70 is pivotally mounted at 77 and engages an inner adjustable stop 78 bearing through its inner end against a resilient abutment member 79. The endless chains 4 carry plates 8 adapted each to be propelled by one of the catches 5 in the movements of the upper sides of the parallel chains 4 from left to right as seen in Figs. 1 and 2. The shaft 2 also acts as the input shaft of a variable-speed drive 8' the output shaft 9 of which is formed with a worm meshing with a worm wheel adapted to drive through known means a Geneva wheel 10 so that another pair of sprocket wheels 11 are driven with intermittent rotary motion. A pair of endless chains 12 are mounted on these sprockets 11 on the one hand, and on the other hand another cooperating pair of idle sprockets 14 coaxial with sprockets 3, as illustrated. These endless chains are also provided with driving catches 13. Vertical walls 15 form above the endless chains 12 a vertical drying chamber. A pair of vertical shafts 16 parallel to the external face of one wall 15 each carry at their bottom end a worm meshing with a pair of oppositely screwed helical worm wheels coaxial and fast with the aforesaid Geneva wheel 10. As will be apparent from the drawings, both vertical shafts 16 are rotated intermittently by the Geneva mechanism and the rotation impressed thereto is transmitted through bevel gears to a pair of horizontal shafts 17 mounted on top of the chamber. Each horizontal shaft 17 has keyed thereon a pair of sprocket wheels 18 having mounted thereon a pair of endless chains 19 running vertically, carrying catch members 20 (see Figs. 2 and 3) and engaging at their bottom ends a corresponding pair of idle sprockets 21 fast with a common horizontal shaft 22. The vertical inner sides of the four chains 19 are thus caused to move upwards with an intermittent motion. At the top of the vertical walls 15 other walls or partitions 23 form an enclosure such that the aforesaid vertical chamber merges with a horizontal drying tunnel. The output shaft 9 from the variable-speed drive 8' is coupled at its other end through bevel gears with a vertical shaft 24 so as to impart a continuous rotational movement thereto. The upper end of the vertical shaft 24, through gears comprising a Geneva wheel 25, drives intermittently a pair of sprockets 26 keyed on a common shaft and having mounted thereon a pair of endless chains 27 provided with catch members 28 running horizontally through the tunnel and guided at the entrance thereof above the vertical walls 15 by a pair of idle guide sprockets 29. Beneath the exit side of the tunnel, that is adjacent to the sprocket wheels 26, are arranged vertical walls 30 forming a vertical drying chamber of the same dimensions as that formed at the entrance side by the vertical walls 15. Each horizontal shaft 17, through the medium of a pair of spur gears, a shaft 31, a universal joint 32, another shaft 33 and another universal joint 34, transmits its intermittent motion to a horizontal shaft 35 carrying a pair of sprocket wheels 36. On both pairs of sprocket wheels 36 are wound endless chains 37 arranged vertically in the tunnel between the partitions 30 and provided with catch members 38. At their bottom portion these chains 37 are wound round pairs of idle sprockets 39 rigidly connected through shaft 40. The inner vertical sides of the four endless chains 37 are thus moved downwards with intermittent motion.

Beneath the four endless chains 37 and in horizontal alignment with the aforesaid pair of endless chains 4 are arranged two horizontal endless chains 41 provided with catch members 42 and carried at the outside by a pair of idle sprockets 43 and at the inside by a pair of driving sprockets 44 coaxial with the aforementioned idle sprockets 6. Through a gear mechanism comprising a Geneva wheel 45 the shaft 9 drives both chain-driving sprockets 44, the arrangement being such that the upper sides of both chains 41 are moved intermittently from left to right when looking at Fig. 1 of the drawings.

Figure 4:
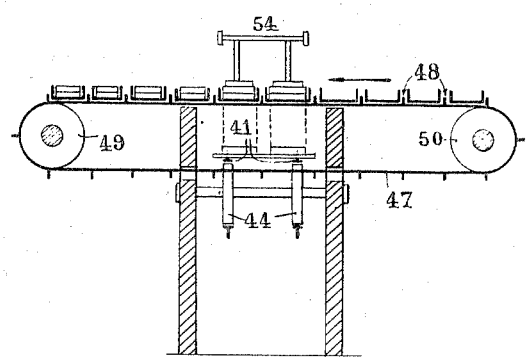
Figure 4 is a vertical section according to the line IV—IV of Fig. 2.

A chute 46 (Fig. 2) feeds empty boxes to an endless belt-conveyor 47 provided with catch members 48 (see Fig. 4) forming on the outside of this belt-conveyor an equal number of adjacent recesses. The belt-conveyor 47 runs horizontally at right angles to the chains 41 and its upper side is positioned at a level higher than that of the upper sides of chains 41. The belt-conveyor 47 is carried at one end by a guiding pulley 49 and at the other end by a driving pulley 50 coaxial and fast with a sprocket wheel 51 rotated by a sprocket chain driven by another sprocket wheel 52 shown in Fig. 1. This sprocket wheel 52 is driven in turn by the shaft 9 through the intermediary of a mechanical motion transformer located in the casing 53 and adapted to produce an intermittent rotational movement whereby the upper side of the endless belt-conveyor 47 is moved in the direction of the arrow Fig. 2. Superposed to the intersection of the endless devices 47 and 41 is a gripping device shown generally at 54 in Fig. 1. As shown more in detail in Fig. 7, this device comprises a link mechanism consisting of four links 80, 81, 82 and 83 forming the sides of a parallelogram having pin joints 84, 85, 86 and 87 at its corners, as shown. The pin joint 85 is mounted in a slide moving in translation in a fixed rectilinear guide 88 and link 82 is constantly parallel to itself. The link 80 is formed with a downwards extension projecting beyond the pin joint 84 and this extension supports a suction plate, compression springs being interposed therebetween to cushion shocks. The lower link 81 of the mechanism carries, in addition to its extreme pin joints 84, 85, an intermediate pin joint 89 for pivotally connecting a crank thereto; this crank is fast with a toothed wheel 90 in meshing engagement with a toothed segment 91 operatively connected with an eccentric 92. A vacuum system (not shown in Fig. 7) is mounted on this mechanism and connected to the aforesaid suction plate.

Figure 5:
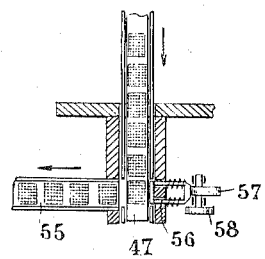
Figure 5 illustrates a detail omitted from Fig. 2 for the sake of clarity.

At the end of the belt-conveyor 47 which is opposite the feed chute 46 is disposed a discharge chute 55 also at right angles to the belt conveyor. A push-member 56 (Fig. 5) is provided at the exit end of, and at right angles to the belt-conveyor 47, in alignment with the discharge chute 55. Spring means continuously urge this push member 56 away from the belt conveyor. The push member 56 is reciprocated by an eccentric 57 mounted on a shaft provided with a sprocket wheel 58 rotated by a sprocket chain driven by another sprocket wheel 59 actuated continuously by the shaft 9 through a mechanical motion-transformer located in the casing 53.

The machine 7 and gripping device 54 are both driven by the motor 1.

The above-described apparatus operates as follows:

The granulated and moistened sugar fills the hopper 61 and under the combined action of gravity and of the rotary stirrers 62 it penetrates into the recess 63 (position A, Fig. 6), as the drum rotates counter-clockwise. Then the recess considered moves past the curved plate 71 and the latter is moved simultaneously in the same direction as the drum; meanwhile, the pistons 64 are pushed by the slide 68 and compress against the curved plate 71 the sugar filling the recesses so as to form or mold a contingent of lumps (position C).

The piston 64 is actuated through the connecting rods 67 by the relevant slide 68 of which the rollers 66 are moved in turn by the compression cam 70. The slide guided in the drum moves in a half radial plane with respect to this drum.

Figure 7:
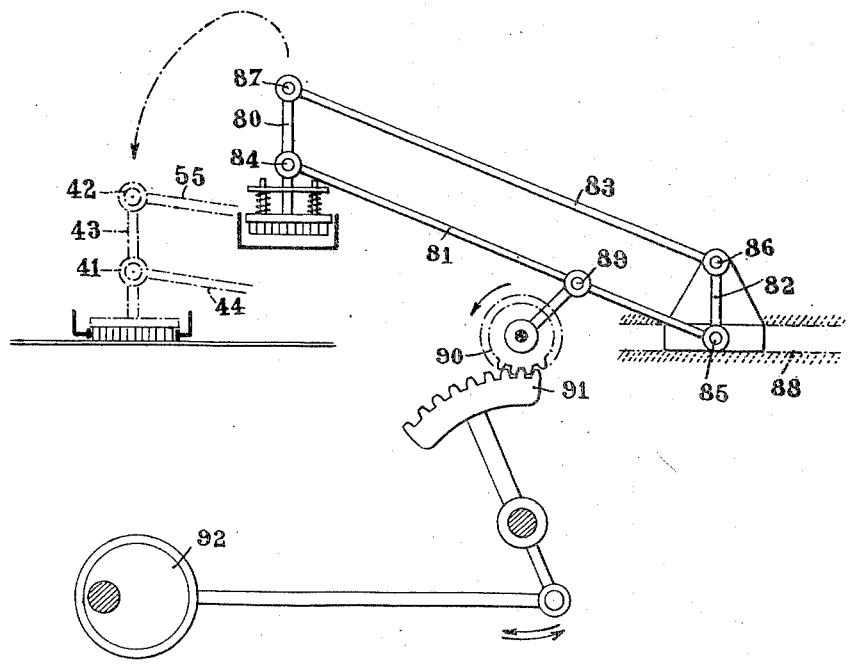

By properly designing the operative surface of the ejection cam 68 acting upon the rollers 66 subsequent to the compression step, the pistons recede slightly so as to detach them from the sugar lumps (position D) and then eject the lumps of one contingent (position E) by moving outward until the outer end surface of the pistons is flush with the external periphery of the drum. Then the lumps fall at 93, by gravity, on the plates 8. The contingent of lumps thus ejected by the machine 7 are placed in rows on the plates 8 travelling beneath this machine with a continuous motion carried by the endless chains 4. The plates 8 are subsequently transferred from the continuously moving chains 4 to the intermittently moving chains 12 so that they are brought beneath the vertical chamber formed by the vertical walls 15 and thus each plate 8 stops between the lower portions of the inner sides of the vertical endless chains 19 until it is picked up by registering pairs of catch members 20. The plates are therefore lifted with an intermittent movement and the lumps carried thereby begin to be dried in the warm and dry atmosphere of this chamber. The plate that arrives immediately below the lower sides of the endless chains 27 remains in this position until it is carried away by a pair of catch members 28 over the floor of the horizontal tunnel formed by the walls 23. As a result, the plates are moved intermittently through the tunnel to the opposite end thereof, that is, above the vertical endless chains 37 and the lumps carried by these plates keep drying in the warm and dry atmosphere of this tunnel. Then the plates are lowered through the chamber formed by the vertical walls 30 where the lumps of the product complete their drying step and when pairs of catch members 38 carrying a plate reach the lower toothed wheel 39 this plate is deposited on the upper sides of the chains 41 and transferred by a pair of catch members 42 with an intermittent motion in the direction of the driving sprockets 44. The endless belt conveyor 47 is fed with empty boxes through the chute 46, whereby each recess is provided on its upper side with an empty box. The gripping device 54 actuated by the eccentric 92 and toothed wheels 91, 90, follows the path shown in chain-dotted lines in Fig. 7, so as to grip, during one stationary period of chains 41, one contingent of lumps carried by a plate 8 supported by said chains. The vacuum, controlled mechanically through means not shown in Fig. 7, is maintained during the time of transfer of said contingent to the endless belt conveyor 47 and is suppressed after the gripping device 54 has been lowered into one of the empty boxes during one stationary period of said endless belt conveyor. The contingent of lumps taken by the gripping device 54 is thus discharged into said empty box and the stationary period of the endless belt conveyor 47 extends during a time sufficient to permit the recurrence of the same operation to transfer the number of contingents necessary to fill the box. Then the filled box travels to the discharge end of the belt-conveyor 47 where it is driven by the push member 56 onto the discharge chute 55 during another stop of the filled box at this end of the belt-conveyor 47. The filled box moves by gravity along the discharge chute towards whatever other operations are necessary or desired. The empty plates unloaded by the action of the gripping device 54 continue their movement on the top sides of the endless chains 41 and are subsequently transferred therefrom to the top sides of the initial endless chains 4 for another loading operation on passing beneath the machine 7.

Whilst I have herein shown and described a specific embodiment of my invention, it will be understood by those conversant with the art that many modifications as to size, shape and means may be covered thereby without departing from the spirit and scope of the invention.

What I claim is:

1. An automatic circuit arrangement for treating and packing into empty boxes lump products manufactured by an automatic machine of the type delivering the lumps in successive contingents, comprising a power shaft rotating continuously, a first pair of toothed ratchet wheels mounted for free rotation, a second pair of ratchet wheels rotated intermittently from said power shaft, a first pair of endless chains having dogs spaced at regular longitudinal intervals thereon, said endless chains being mounted horizontally on said pair of ratchet wheels and driven with an intermittent longitudinal motion from said second pair of ratchet wheels, a third pair of ratchet wheels mounted for free rotational movement coaxially to said second pair of ratchet wheels, a fourth pair of ratchet wheels driven with a continuous rotary motion from said power shaft, a second pair of endless chains having dogs spaced at regular longitudinal intervals thereon, the chains of said second pair being mounted horizontally on said third and fourth pair of ratchet wheels and driven with a continuous longitudinal motion from said fourth pair of ratchet wheels, a fifth pair of ratchet wheels mounted coaxially to said fourth pair of ratchet wheels for free rotational movement, a sixth pair of ratchet wheels driven for intermittent rotational motion from said power shaft, a third pair of endless chains carrying dogs spaced at regular longitudinal intervals, said chains being mounted horizontally on said fifth and sixth pairs of ratchet wheels and driven for intermittent longitudinal motion from said sixth pair of ratchet wheels, plates laid on said second pair of endless chains and carried along by said chains with a continuous longitudinal motion, a machine of the above-defined type overlying said second pair of endless chains and depositing on each of said plates a contingent of lump products as the relevant plate passes beneath said machine, means adapted to remove said plates loaded with the product to be treated from said third pair of endless chains, said plates having been pushed onto said endless chains by the dogs of said second pair of endless chains so as to cause said loaded plates to travel through zones in which said lump products are treated, said means being also adapted to deposit said plates loaded with treated lump products onto the first pair of endless chains adapted to carry along with an intermittent longitudinal movement a horizontal endless belt having an inlet end and an outlet end disposed on either side and an upper reach overlying said first pair of endless chains and having impressed thereto an intermittent longitudinal motion, fixed lugs on said endless belt for defining recesses dimensioned to correspond to said empty boxes, an inclined plane adapted to direct said empty boxes into said recesses at the inlet end of said belt, a gripper actuated periodically from said power shaft and adapted to remove said contingents of lump products carried by said plates laid on said first pair of endless chains and to arrange said lump products in said empty boxes located in the recesses of the upper reach of said endless belt, whilst the unloaded plates carried along by said first pair of endless chains are pushed by the dogs of said first pair of endless chains onto said second pair of endless chains, and means for discharging said boxes filled with treated products when the recesses containing said boxes reach the outlet end of said horizontal endless belt.

2. An automatic circuit arrangement for treating lump products as claimed in claim 1, wherein said first means comprise a pair of shafts mounted for free rotary motion, in parallel relationship to, and on either side of, said third pair of endless chains, each shaft of said pair having mounted at either ends a ratchet wheel, another pair of shafts mounted in parallel relationship to, and at a higher level than, said first pair of shafts, said other pair of shafts being rotatably driven from said power shaft for intermittent rotational motion, each shaft of said other pair having mounted at either ends a ratchet wheel, a fourth and a fifth pairs of endless chains mounted vertically on said ratchet wheels of said first and second pair of shafts, said two pairs of endless chains having dogs mounted at spaced intervals thereon and being adapted through said dogs to lift to a higher level each of said plates loaded with said lump products to be treated which have previously been delivered by said third pair of endless chains, a horizontal support disposed at said upper level and having an inlet end adjacent to said second pair of shafts and an outlet end remote therefrom, two pairs of ratchet wheels mounted above said upper level, one of said pairs of ratchet wheels being mounted for free rotational movement and the other driven for intermittent rotational movement from said power shaft, a sixth pair of endless chains having regularly spaced dogs and mounted horizontally on said last-mentioned pair of ratchet wheels so as to be driven for longitudinal reciprocating motion, each of said last-mentioned shafts having mounted at either ends a ratchet wheel, another pair of shafts parallel to the former and disposed on either side of said first pair of endless chains, each of said two other shafts having a ratchet wheel mounted on either ends, a seventh pair and an eighth pair of vertical endless chains being mounted on the ratchet wheels of said last-mentioned four shafts, dogs carried by said two pairs of endless chains, the latter being adapted on the one hand to receive on said dogs plates loaded with lump products pushed by the dogs of said sixth pair of endless chains beyond the outlet end of said horizontal support, and on the other hand to lower said loaded plates and deposit said plates loaded with treated products onto said first pair of endless chains.

3. An automatic circuit arrangement for treating lump products and packing same into empty boxes as claimed in claim 1, wherein said second means comprise an inclined plane having an inlet end adjacent to one side of said outlet end of said endless belt, a push member adjacent to the other side of said outlet end of said endless belt, a spring acting on said push member so as to urge same in the direction in which said push member is moved away from said outlet end of said inclined plane, and a cam driven for continuous rotational movement from said power shaft and adapted to push each box filled with lump products onto said inclined plane when said box enters a recess of said endless belt at the outlet end of said endless belt.

References Cited in the file of this patent

UNITED STATES PATENTS

| | | |
|---|---|---|
| 1,010,174 | Pooley | Nov. 28, 1911 |
| 1,592,411 | Anderson et al. | July 13, 1926 |
| 1,682,814 | Trifelos | Sept. 4, 1928 |

FOREIGN PATENTS

| | | |
|---|---|---|
| 881,377 | France | Apr. 22, 1943 |